United States Patent Office 3,306,130
Patented Feb. 28, 1967

3,306,130
DIFFERENTIAL GEAR WITH LOCKING MEANS
Willi Ernst Salzmann, 111 Bielstrasse,
Solothurn, Switzerland
Filed Nov. 30, 1964, Ser. No. 414,916
Claims priority, application Switzerland, Dec. 2, 1963,
14,858/63
6 Claims. (Cl. 74—710.5)

This invention relates to a differential gear with locking means for selectively locking said differential gear, said differential gear including a rotary gear case, two bevel gear wheels mounted for rotation in said gear case, a plurality of bevel pinions mounted for rotation in said gear case and each meshing with both of said bevel gear wheels, and two colinear half-shafts extending from said gear case and secured one to each of said bevel gear wheels, said gear case having in one side a plurality of bores disposed equi-distantly from and parallel to and on a pitch circle concentric with one of said half-shafts, and one of said bevel gear wheels having a plurality of tapered openings, said locking means comprising a plurality of axially-movable coupling pins disposed one in each of said bores and each having a tapered end, and means for selectively moving said coupling pins axially in unison towards and away from said bevel gear having said tapered openings, the arrangement being such that when said coupling pins are moved axially for locking said differential gear each of said tapered ends enters one of said tapered openings and upon the occurrence of an overload and tapered form causes said tapered ends to be automatically forced out of said tapered openings.

Such a differential gear with locking means is described in the specification of Patent No. 3,105,394 and the present invention is an improvement in or modification of the invention described in the said specification.

Whereas the examples of embodiment illustrated in the above-mentioned specification are suitable for tractors, the present invention is concerned with providing differential gears with locking means which as in the case of the examples of embodiment described below are suitable for cross-country vehicles but are also suitable for various kinds of motor vehicles such as sedans, pick-up trucks and farm vehicles and tractors.

Figure 1:
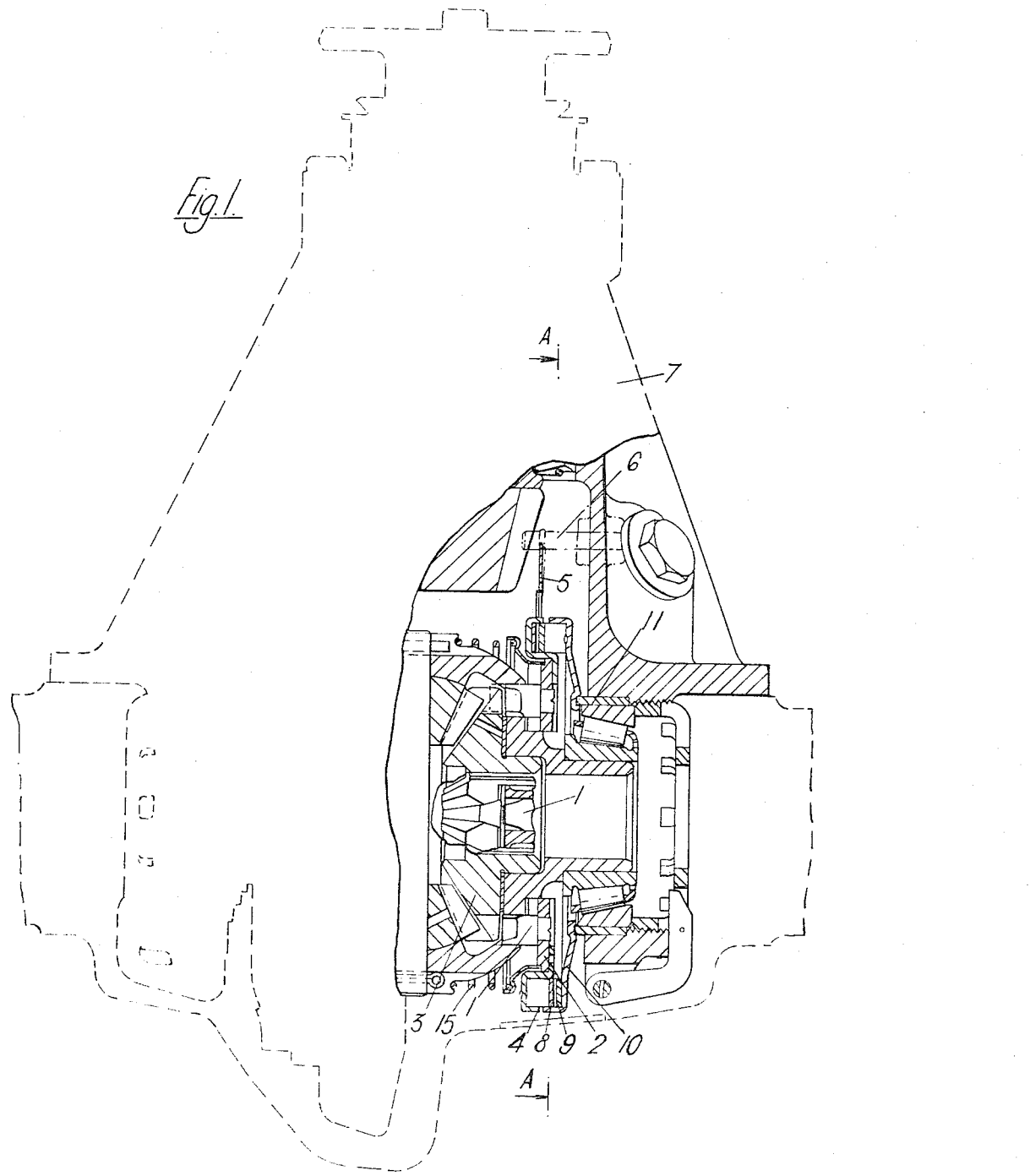
Figure 2:
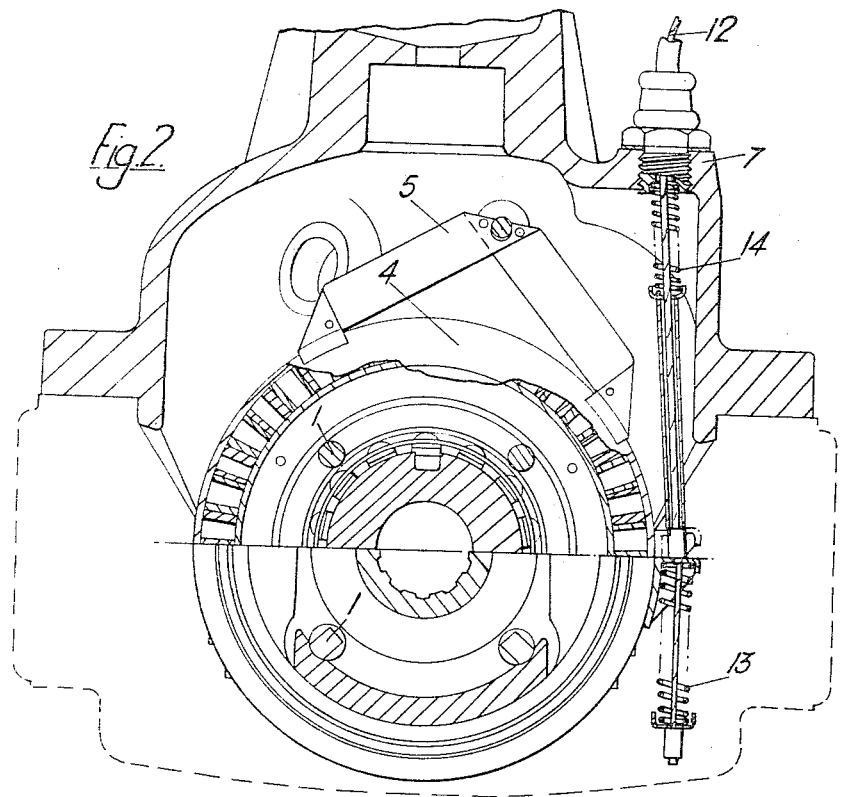
Figure 3:
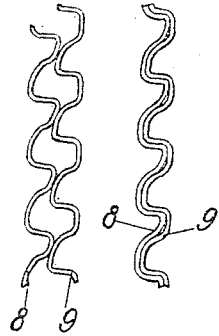
Figure 4:
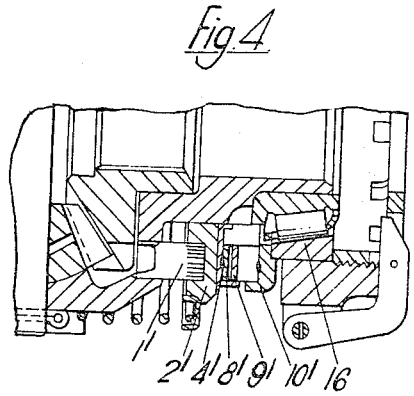

In the accompanying drawings a differential gear with locking means in accordance with the invention is illustrated by way of example, FIGURE 1 being a partial plan view partly in horizontal section of parts of a vehicle rear axle and differential gear with locking means, FIGURE 2 a view in cross-section in two planes on the line A—A in FIGURE 1, FIGURE 3 representing development of face cams in two different relative positions, and FIGURE 4 being a fragmentary view partly in horizontal section illustrating a modified construction.

Referring to FIGURES 1, 2 and 3 of the drawings, the rear axle housing 7 and differential gear which includes a rotary gear case in which are mounted two bevel gear wheels 3 are of substantially conventional construction. The locking means comprises four coupling pins 1 which are secured (for example riveted or stamped) in a rotatable coupling ring 2 (for example of bronze). The pins 1 are capable of engaging with their V-shaped ends (including angle approximately 28° close to but not actually self-locking) in complementary recesses located between the teeth of one bevel gear wheel 3 (or at the periphery of an adapter disk secured thereon). The coupling ring 2 rotates in a stationary thrust ring 4 (for example deep drawn sheet steel) which is secured against rotation by means of a lever 5 (for example a bent spring steel) secured thereon and engaging a peg 6 in the axle housing 7. In the thrust ring 4 is secured a sheet metal ring 8 which forms a plurality (for example 20) of face cams which co-operate with complementary face cams formed by a metal ring 9, see FIGURE 3. The ring 9 is secured in a thrust cage 10 which is capable of limited rotation upon a sleeve 11 and may be partly rotated relative to the axle housing 7 by means of a Bowden control cable 12. The metal rings 8 and 9 may be deep drawn to form the face cams, either one ring at a time or in accordance with a feature of the invention two complementary rings 8 and 9 may be deep drawn together.

When the thrust cage 10 is rotated by means of the cable 12 the face cams of the ring 8 ride up upon those of the ring 9 as shown in the lower part of FIGURE 3 and thus the thrust ring 4 and coupling ring 2 are pushed towards the bevel gear wheel 3 so that the coupling pins 1 engage in the above-mentioned recesses and the differential gear is locked. The right part of FIGURE 3 represents the relative positions of the face cams when the locking means is inoperative. The shape of the face cams is such that their initial engagement angle is very steep (for example 75°) whereas their engagement angle towards the end of their relative movement in effecting locking is relatively small (for example 15°) and not much above the small angle at which self-locking would occur. Thus on the one hand during the initial stages of engaging the lock no great axial force can be exerted, and on the other hand upon the occurrence of an overload the lock is automatically disengaged, this being effected with the aid of a relatively small preferably pre-stressed compression spring 13 which transmits motion from the cable 12 to the thrust cage 10 and which also permits a pre-selection of the differential lock. Compression return springs 14 and 15 are arranged for returning the cable 12 and the coupling ring 2 to their initial positions. It will be readily appreciated that the described locking means is exceptionally compact and simple in operation.

The operation of the locking means is effected for example through any suitable pedal or hand lever with or without any suitable detent means and operatively connected to the cable 12. In an instance where there are two such differential gears with locking means (front axle and rear axle) the two control cables may be connected to a common control pedal or lever either directly or through resilient means or through a two-armed rocking lever with equal or unequal arms or a compensating pulley, and by such means the two locking devices are brought into an interesting interdependent condition. This may have the effect that upon automatic disengagement of one of the locking devices upon the occurrence of an overload the preselection and safety spring 13 of the other locking device is more strongly pre-stressed by automatic displacement of the cable 12 so that the load necessary to cause disengagement of the second locking device is increased. The re-engagement of one or both of the locking devices after they have been disengaged because of overloading can be effected by a brief disengagement of the vehicle clutch or a momentary release of its throttle pedal allowing the springs 13 to operate automatically. Naturally this locking device can always be disengaged manually even while under full load because the coupling pins 1 in consequence of their V-shaped ends cannot become locked. Thus the steerability of the vehicle can be immediately restored whenever desired and so accidents can be avoided. Moreover through the already described automatic disengagement of the locking device upon the occurrence of an overload there is an inherent insurance against mechanical damage. The torque transmissible through the locking device depends upon the characteristics of the face cams on the rings 8 and 9 and of the safety spring 13 (and naturally also upon the angle of the V-shaped ends of the pins 1) and may be determined at any desired magnitude and if desired subsequently adjusted from the exterior. Thus for example for a steered front axle a lower disengagement torque is desirable than in the case of a more robust rear axle, likewise in the case of subsequent incorporation of differential locks in vehicles of which the axles are not sufficiently strong. Also in unfavourable circumstances (disengagement torque equal to half the maximum driving torque) the locking action of the above described safety locking device is nevertheless substantially better than that of self-locking differentials of various systems of which the efficiency is low, and which moreover have the disadvantage that they cannot be self-releasing.

In FIGURE 4 like reference numerals indicate like parts with reference to the above described embodiment, but with the addition of index marks. In the modification illustrated in FIGURE 4 thanks to there being more space available the whole operating arrangement comprising the parts 8', 9' and 10' is in direct association with the coupling pins 1', the sliding coupling ring 2' preferably consists of synthetic plastics material with the coupling pins 1' either mounted therein or secured by adhesive. Furthermore the thrust ring 10 is mounted directly for limited rotation upon the outer ring 16 of a taper roller bearing in which is mounted the rotary gear case.

The illustrated examples of embodiment are intended primarily for light and sprung axles yet may also by appropriate reinforcement and modifications of detail (for example thrust ring 4 with lever 5 forged out of a single piece or pressed or cast) be adapted for use with the axles of heavy vehicles. In the case of unsprung axles (for example as in tractors and earth moving machines) a tension rod or linkage may be substituted for the flexible cable 12 and be operated by a hand lever or pedal (with or without detent). In all kinds of vehicles the mechanical control means may be replaced by pneumatic or hydraulic or electromagnetic control means with which in some circumstances the pre-selection and safety spring 13 may be rendered superfluous.

The face cams need not be provided by means of separate rings 8 and 9 (or 8' and 9') as illustrated, but may be formed integrally upon the thrust ring 4 (or 4') and the thrust cage 10 (or 10') and these parts may be of any suitable material, for example bronze or other metal or synthetic plastics material, and may be made by any suitable method, for example casting or forging or pressing or moulding.

I claim:

1. The combination comprising, in an axle housing, a differential gear and locking means for selectively locking said differential gear, said differential gear including a rotary gear case, two bevel gear wheels mounted for rotation in said gear case, a plurality of bevel pinions mounted for rotation in said gear case and each meshing with both of said bevel gear wheels, and two co-linear half-shafts extending from said gear case and secured one to each of said bevel gear wheels, said gear case having in one side a plurality of bores disposed parallel to and on a pitch circle concentric with one of said half-shafts, and one of said bevel gear wheels having a plurality of V-shaped openings provided in said bevel gear wheel, said locking means comprising an operating device, a coupling ring, a thrust ring, a plurality of axially-movable coupling pins disposed one in each of said bores and each having a V-shaped end and being secured to said coupling ring, said coupling ring being rotatable in said thrust ring, and means for selectively moving the V-shaped ends of said coupling pins in unison into said V-shaped openings provided in said bevel gear wheel for locking said differential gear, said means for moving said coupling pins comprising a pair of axial face cam rings arranged between said thrust ring and said axle case and concentric with one of said half-shafts, one of said axial face cam rings being torsionally secured to said axle housing and the other of said axial face cam rings being arranged for limited rotation by means of said operating device.

2. The combination as claimed in claim 1, said means for selectively moving said coupling pins including a thrust cage, said pair of axial face cam rings being arranged between said thrust ring and said axle case and concentric with one of said half-shafts, one of said axial face cam rings being in fixed relationship with said thrust ring and being torsionally secured to said axle case, the other of said axial face cam rings being in fixed relationship with said thrust cage, said thrust cage being mounted for rotation on said axle housing and being arranged for limited rotation by said operating device acting tangentially on the circumference of said thrust cage.

3. The combination as claimed in claim 1, said axial face cam rings comprising each a plurality of axial cams, the profile of these cams being steep at the beginning and flat at the end, but without being self-locking, said cam rings may be deep-drawings and identical.

4. The combination as claimed in claim 1, said means for selectively moving said coupling pins including a thrust cage mounted for rotation on said axle housing and arranged for limited rotation by said operating device acting tangentially on the circumference of said thrust cage, one of said axial face cam rings being in fixed relationship with said thrust cage, and said operating device including an operating cable and a prestressed pre-selecting and safety spring, said spring being disposed for transmitting forces between said cable and said thrust cage.

5. The combination as claimed in claim 1, said means for selectively moving said coupling pins, said operating device, said V-shaped ends, and said V-shaped openings being so constructed and adjusted that upon the occurrence of an overload said V-shaped ends are automatically forced out of said V-shaped openings.

6. The combination as claimed in claim 1 and at least one further combination as claimed in claim 1, in said combination and in each said further combination said operating device including an operating member and a prestressed pre-selecting and safety spring, said safety spring being disposed for transmitting forces between said operating member and that one of said axial face cam rings arranged for limited rotation by means of said operating device, said means for selectively moving said coupling pins, said operating device, said V-shaped ends, and said V-shaped openings being so constructed and adjusted that upon the occurrence of an overload said V-shaped ends are automatically forced out of said V-shaped openings and said operating devices and said safety springs of said combination and of each said further combination being interconnected and arranged so that all said locking means are rendered operative simultaneously and that upon the occurrence of an overload causing automatic disengagement of said locking means of said combination there is automatic stronger pre-stressing of said safety spring of each said further combination.

References Cited by the Examiner

UNITED STATES PATENTS

| | | | |
|---|---|---|---|
| 964,387 | 8/1909 | Burham | 74—710.5 |
| 1,173,442 | 2/1916 | Kuhn | 74—710.5 |
| 1,193,017 | 8/1916 | Higinbotham | 74—710.5 |
| 1,719,095 | 7/1929 | West | 74—710.5 |

FOREIGN PATENTS 1,703   1915   Great Britain.

DAVID J. WILLIAMOWSKY, *Primary Examiner.*

L. H. GERIN, *Assistant Examiner.*